Patented Mar. 2, 1948

2,436,814

UNITED STATES PATENT OFFICE 2,436,814

ORTHO-TOLIDINE TABLET COMPOSITION

James L. Leitch, Bel Air, Md.

No Drawing. Application June 8, 1943,
Serial No. 490,055

7 Claims. (Cl. 252—408)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates generally to ortho-tolidine tablets to be used in the determination of residual chlorine in connection with the purification of water by chlorination, and in connection with the so-called "chlorine demand test."

It is necessary for the armed forces in the field to purify or disinfect their water supply except in those instances where it is certain that such treatment is not necessary. The standard method of purifying water is to add a chlorinating agent thereto. Ampules of calcium hypochlorite are regularly used for this purpose. The free or available chlorine furnished will destroy bacteria, and will react with organic impurities and certain toxic compounds to form innocuous products. It is necessary that sufficient chlorine be added to the water supply so that a predetermined minimum concentration of residual chlorine will be left therein. This will insure that the purification treatment of the water has been adequate and that the water is safe to use for drinking and other purposes.

The ortho-tolidine tablets provided by this invention are particularly adapted for use in determining the residual chlorine content of water purified by chlorination, as will appear hereinafter.

Another use for the ortho-tolidine tablets of this invention is in connection with the so-called "chlorine demand test." Briefly, this test consists of adding to a sample of water to be tested of predetermined volume, a known dose of available chlorine, for example in the form of bleaching solution. The available chlorine will react with organic matter and certain toxic chemicals which may be contained in the water and which render it non-potable. When a predetermined period of time has elapsed after the addition of the available chlorine, ortho-tolidine indicator is added to the water sample so that, as will be explained in detail hereinafter, a quantitative determination of the residual chlorine remaining in the water sample can be made. The difference between the dose of available chlorine added to the water sample and the residual chlorine remaining therein, represents the chlorine demand of the water and is an indication of the purity thereof. That is, the greater the amount of available chlorine which is consumed in the predetermined period by the water sample, the greater is its impurity.

As indicated, it has been known heretofore that ortho-tolidine may be used as an indicator for the quantitative determination of residual chlorine. More specifically, it has been found that when a sufficient concentration of ortho-tolidine is added to water having the proper acidity, the ortho-tolidine reacts with the residual chlorine in the water to give a characteristic canary yellow color. The depth or shade of the canary yellow color developed varies with the concentration of the residual chlorine. Thus, by the use of a comparator or color standard, the concentration of residual chlorine can be quantitatively determined by this method.

Heretofore, the ortho-tolidine has been used in the form of a liquid reagent, usually a solution of ortho-tolidine in hydrochloric acid. However this reagent is relatively unstable and is not adapted for use in the field. The test for residual chlorine by this reagent is relatively sensitive and must be carried out with a fair degree of accuracy in order to obtain reliable and reproducible results. This feature is particularly objectionable in the armed forces where relatively unskilled and inexperienced personnel must often be relied upon to make these tests. In addition it is always objectionable to supply and transport in the field liquid reagents, because of the breakage problem involved. In other words, although the ortho-tolidine reagent may be satisfactory for use in the laboratory by skilled personnel, it is not at all adapted for use by troops in the field.

Accordingly, the object of this invention, generally stated, is the provision of ortho-tolidine tablets for use in determining residual chlorine in water whereby the prior inaccuracy of this test by inexperienced personnel is eliminated and the ortho-tolidine indicator is in a form particularly adapted for use in the field. Furthermore, the ortho-tolidine tablets are stable and eliminate the prior problems of breakage and instability associated with the use of the ortho-tolidine reagent.

Other objects of the invention will, in part, be obvious and will appear hereinafter.

For a more complete understanding of the nature and scope of this invention, reference may be had to the following detailed description thereof setting forth by way of illustration certain specific embodiments and compositions.

In general, the ortho-tolidine tablets provided by this invention are made from a composition consisting essentially of a relatively small amount of ortho-tolidine, a material which will give an acid solution on dissolving in water, and a non-alkaline inert filler and binder material. The acid forming material is used in such a proportion to the ortho-tolidine content, that when a sufficient amount of the ortho-tolidine is added to a water sample, enough of the acid forming material will also be added therewith to permit the characteristic canary yellow color to develop. The proportion of the non-alkaline inert material used is that which is sufficient to permit a good grade of tablets to be made in ordinary tablet-making machines and to give sufficient mass to the tablets.

As indicated above the ortho-tolidine must be added in a certain minimum amount to the sample of water to be tested in order to obtain satisfactory results. The development of the characteristic canary yellow color depends upon both the concentration of the ortho-tolidine and the acidity of the water solution. Enough of the ortho-tolidine must be added so that upon the reaction thereof with the residual chlorine, only the partial oxidation product of the ortho-tolidine can be formed as distinguished from the completely oxidized product thereof. It is this partial oxidation product of the ortho-tolidine which gives the characteristic canary yellow color. If too little of the ortho-tolidine is added, the more completely oxidized product will be formed so that the resulting colored compounds cannot be used for the quantitative determination of residual chlorine.

Furthermore, it has been found that the acidity of the water sample must be at least pH 2 or greater in order for the characteristic canary yellow color to be formed. At acidities more alkaline than pH 2, green, blue, and muddy (decomposition) colors may result which cannot be used in the quantitative determination of residuel chlorine. Different acid forming ingredients may be used for imparting to the solutions the desired acidity. Certain acid salts may be used for this purpose, and specifically the anhydrous alkali metal acid sulfates have been found to serve very satisfactorily.

Several inert filler materials may be used such as, pulverized sodium chloride, arrow-root starch, and agar-agar. The inert filler and binder material may be acid or neutral but cannot be alkaline, and must have no reaction with residual cholrine or ortho-tolidine. Furthermore, the inert filler material must give colorless and non-turbid solutions in water, and must be stable in storage.

One specific tablet composition which has been found to be satisfactory has the following composition:

About one part by weight of ortho-tolidine dihydrochloride, at least 100 parts by weight of fused potassium acid sulfate, and from 100 to 300 parts by weight of non-alkaline filler and binder material which is non-reactive with either residual chlorine or ortho-tolidine. The fused potassium acid sulfate may be replaced with not less than 87 parts by weight of anhydrous sodium acid sulfate.

Ortho-tolidine tablets may be made from the above tablet composition so that each tablet contains from 0.8 to 1.0 mg. of ortho-tolidine dihydrochloride, at least 100 mg. of fused potassium acid sulfate, and sufficient inert filler material, such as sodium chloride, to give the tablet a final weight of from 200 to 400 mg. If anhydrous sodium acid sulfate is used in the tablets, each tablet should contain at least 87 mg. thereof.

One of the ortho-tolidine tablets made with the active ingredients in these proportions and amounts, will be sufficient for testing the residual chlorine in a 20 ml. sample of water containing as many as 1000 P. P. M. (parts per million) of total alkalinity.

The tablets should be compacted to such a degree that they will retain their shape and be free from breakage, but will readily dissolve in water in not more than 5 minutes.

As mentioned above, the ortho-tolidine tablets are now widely used in connection with the purification of water in the field. Thus, to each Lyster bag of water the contents of a standard calcium hypochlorite ampule are added and the water is stirred for about ten minutes. After this period of stirring the cup of the standard test kit furnished for this purpose is filled up to the graduation mark with a sample of the water and one of the ortho-tolidine tablets described above is added. The water sample is agitated for five minutes and then the depth of the canary yellow color developed in the solution is compared with depth of the yellow indicator standard provided in the bottom of the cup. The yellow color of the water should have a depth at least equal to that of the yellow standard provided in the bottom of the cup. If not, additional calcium hypochlorite is added to the water in the Lyster bag until on testing it is found to have at least the minimum residual chlorine content required.

Since certain changes and modifications may be made in the foregoing compositions and the ingredients used therein, it is intended that all matter described hereinbefore shall be interpreted as illustrated and not in a limited sense.

I claim as my invention:

1. An ortho-tolidine tablet composition adapted to be used in determining the residual chlorine content of a water sample, which consists essentially of: ortho-tolidine dihydrochloride; a sufficient amount of alkali metal acid sulfate in predetermined proportion to the ortho-tolidine content so that, when a sufficient amount of ortho-tolidine in tablet form is added to said water sample whereby upon reaction thereof with the residual chlorine therein only the partial oxidation product of the ortho-tolidine will be formed as distinguished from the completely oxidized product thereof, the alkali metal acid sulfate will be sufficient to impart to said water sample an acidity of at least pH 2; and, sufficient non-alkaline inert filler material to give mass to tablets made from said tablet composition and serve as a binder for the active ingredients thereof; said non-alkaline inert filler material being non-reactive with either the residual chlorine or the ortho-tolidine.

2. An ortho-tolidine tablet composition adapted to be used in determining the residual chlorine in water which consists essentially of, about one part by weight of ortho-tolidine dihydrochloride, at least enough alkali metal acid sulfate to give about 75 milliequivalents of strong acid for each milligram of said ortho-tolidine dihydrochloride, and sufficient non-alkaline inert filler material to give desired mass to tablets made from said tablet composition.

3. An ortho-tolidine tablet composition adapted to be used in determining the residual chlorine in water which consists essentially of, about one part by weight of ortho-tolidine dihydrochloride, not less than 100 parts by weight of fused potassium acid sulfate, and from about 100 to 300 parts by weight of non-alkaline filler and binder material which is non-reactive with either residual chlorine or said ortho-tolidine.

4. An ortho-tolidine tablet composition adapted to be used in determining the residual chlorine in water which consists essentially of, about one part by weight of ortho-tolidine dihydrochloride, not less than 87 parts by weight of anhydrous sodium acid sulfate, and from about 100 to 300 parts by weight of non-alkaline filler and binder material which is non-reactive with either residual chlorine or said ortho-tolidine.

5. An ortho-tolidine tablet adapted to be used in determining the residual chlorine in water, which consists essentially of, from about 0.8 to 1.0 mg. to ortho-tolidine dihydrochloride, at least sufficient alkali metal acid sulfate to be equivalent to 75 milliequivalents of strong acid, and inert filler and binder material to give said tablet a final weight of from about 200 to 400 mg.

6. An ortho-tolidine tablet adapted to be used in determining the residual chlorine in water, which consists essentially of, from about 0.8 to 1.0 mg. of ortho-tolidine dihydrochloride, at least 100 mg. of fused potassium acid sulfate, and from about 100 to 300 mg. of sodium chloride.

7. An ortho-tolidine tablet adapted to be used in determining the residual chlorine in water, which consists essentially of, from about 0.8 to 1.0 mg. of ortho-tolidine dihydrochloride, at least 87 mg. of anhydrous sodium acid sulfate, and from about 100 to 300 mg. of sodium chloride.

JAMES L. LEITCH.

REFERENCES CITED

The following references are of record in the file of this patent:

UNITED STATES PATENTS

| Number | Name | Date |
|---|---|---|
| 1,986,403 | Lehmkuhl | Jan. 1, 1935 |
| 2,079,512 | Körösy | May 4, 1937 |
| 2,290,436 | Kamlet | July 21, 1942 |
| 2,385,471 | Sharer | Sept. 25, 1945 |

OTHER REFERENCES

Yoe, "Photometric Chemical Analysis," John Wiley & Sons, Inc. (1928), vol. I, pages 157–159.

Wood, "Tablet Manufacture," J. B. Lippincott Co. (1904), page 39.